(12) United States Patent
Pan et al.

(10) Patent No.: US 9,727,800 B2
(45) Date of Patent: Aug. 8, 2017

(54) OPTIMIZED OBJECT DETECTION

(71) Applicant: QUALCOMM Incorporated, San Diego, CA (US)

(72) Inventors: Qi Pan, Vienna (AT); Romain Tallonneau, Vienna (AT); Emilio Maggio, Vienna (AT); Stefan Walk, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 14/866,781

(22) Filed: Sep. 25, 2015

(65) Prior Publication Data

US 2017/0091943 A1 Mar. 30, 2017

(51) Int. Cl.
*G06K 9/00* (2006.01)
*G06T 7/00* (2017.01)
(Continued)

(52) U.S. Cl.
CPC ........... *G06K 9/481* (2013.01); *G06K 9/3233* (2013.01); *G06K 9/46* (2013.01); *G06K 9/4633* (2013.01);
(Continued)

(58) Field of Classification Search
CPC .. G06T 7/70; G06T 7/10; G06T 7/143; G06K 9/3233; G06K 9/46
See application file for complete search history.

(56) References Cited

U.S. PATENT DOCUMENTS 6,574,351 B1 6/2003 Miyano
8,009,921 B2 * 8/2011 Csurka ............... G06K 9/00664
382/228

(Continued)

FOREIGN PATENT DOCUMENTS

WO 2013182298 A1 12/2013
WO 2014155131 A2 10/2014

OTHER PUBLICATIONS

Grabner H., et al., "Tracking the invisible: Learning where the object might be", 2010 IEEE Conference on Computer Vision and Pattern Recognition (CVPR), Jun. 13-18, 2010, San Francisco, CA, USA, IEEE, Piscataway, NJ, D1 :USA, Jun. 13, 2010 (Jun. 13, 2010), XP031725649, pp. 1285-1292, ISBN: 978-1-4244-6984-0.

(Continued)

*Primary Examiner* — Utpal Shah

(57) ABSTRACT

Disclosed are a system, apparatus, and method for detecting objects. Input image frames may be received and distinct regions created within each frame. Descriptors may be extracted from the regions according to their associated probability. Extracted descriptors may be matched to reference descriptors. Votes or confidence is cast for particular regions according to region properties. The region properties may be determined from center voting methods based on vector intersection to other vectors or intersections with a region. The probability of selecting particular regions can increase with each vote or increase in confidence for a region. In response to updating probabilities, additional regions may be selected and additional descriptors may be extracted. Additional voting iterations can update the probability of selecting a next region. An object pose may be estimated in response to meeting one or more thresholds.

30 Claims, 14 Drawing Sheets

(51) Int. Cl.
  *G06K 9/48* (2006.01)
  *G06T 7/70* (2017.01)
  *G06T 7/10* (2017.01)
  *G06K 9/46* (2006.01)
  *G06K 9/62* (2006.01)
  *G06K 9/32* (2006.01)

(52) U.S. Cl.
  CPC ......... *G06K 9/4671* (2013.01); *G06K 9/6212* (2013.01); *G06K 9/6277* (2013.01); *G06T 7/0044* (2013.01); *G06T 7/0081* (2013.01); *G06T 7/10* (2017.01); *G06T 7/70* (2017.01); *G06K 2009/3291* (2013.01); *G06T 2207/20076* (2013.01); *G06T 2207/20148* (2013.01)

(56) References Cited

U.S. PATENT DOCUMENTS

| | | | | |
|---|---|---|---|---|
| 8,111,873 B2* | 2/2012 | Berthilsson | ........ | G06K 9/00771 382/103 |
| 8,326,037 B1* | 12/2012 | Abitz | ........ | G06K 7/1443 235/462.01 |
| 8,897,578 B2 | 11/2014 | Huang et al. | | |
| 9,042,659 B2 | 5/2015 | Adamek et al. | | |
| 9,635,245 B2* | 4/2017 | Nakagata | ........ | H04N 5/23212 |
| 2005/0047647 A1* | 3/2005 | Rutishauser | ........ | G06K 9/3233 382/159 |
| 2006/0239541 A1* | 10/2006 | Florin | ........ | G06K 9/34 382/154 |
| 2011/0090359 A1* | 4/2011 | Sagawa | ........ | G06K 9/3233 348/222.1 |
| 2011/0222774 A1 | 9/2011 | Hong et al. | | |
| 2012/0155751 A1 | 6/2012 | Aoba | | |
| 2016/0232418 A1* | 8/2016 | Inoshita | ........ | G06K 9/3233 |

OTHER PUBLICATIONS

International Search Report and Written Opinion—PCT/US2016/045874—ISA/EPO—Nov. 15, 2016, 16 pgs.

Frome A., et al., "Recognizing Objects in Range Data Using Regional Point Descriptors," European Conference on Computer Vision, 2004, vol. 3023, pp. 224-237.

Gu C., "Recognition Using Regions," Electrical Engineering and Computer Sciences, University of California at Berkeley, May 29, 2012, 85 Pages.

* cited by examiner

HIGHEST PROBABILITY REGION
530

OPTIMIZED OBJECT DETECTION

FIELD

The subject matter disclosed herein relates generally to computer vision techniques for object detection.

BACKGROUND

Computer vision is a field that includes methods and systems for acquiring, analyzing, processing, and understanding images (e.g., real world image captures) to provide an event or result. One aspect of computer vision is determining a position and orientation of objects within a scene relative to the camera. Typically pose is determined linearly from detecting keypoints, extracting descriptors, matching descriptors and using the detected descriptors to detect potential objects within the image. However, linear extraction and matching typically leads to wasted resources due to extracting descriptors that do not actually represent a target object. For example, the extracted descriptors within an image may include descriptors not only from the target object but also typically from one or more background objects or other noise that interferes with a fast and accurate detection of the object.

SUMMARY OF THE DESCRIPTION

Embodiments disclosed herein may relate to a method for detecting a target object, the method may include: receiving an input image frame; creating a plurality of distinct regions within the input image frame, where the plurality of distinct regions has a first probability distribution comprising of a particular probability of being selected for each respective region in the plurality of distinct regions; selecting, according to the first probability distribution, a first region from the plurality of distinct regions; extracting, from the first region, a first one or more descriptors from a first one or more feature points detected within the first region; analyzing one or more properties of the first region to update a particular probability of the first region being selected; creating a second probability distribution for the plurality of distinct regions according to the particular probability of the first region being selected; selecting, according to the second probability distribution, a second region from the plurality of distinct regions; extracting, from the second region, a second one or more descriptors from a second one or more feature points detected within the second region; and referencing at least the first one or more descriptors and the second one or more descriptors for detecting the target object.

Embodiments disclosed herein may relate to a server to provide target object detection, the server including memory; a processor coupled to the memory and configured to: receive an input image frame; create a plurality of distinct regions within the input image frame, where the plurality of distinct regions has a first probability distribution comprising of a particular probability of being selected for each respective region in the plurality of distinct regions; select, according to the first probability distribution, a first region from the plurality of distinct regions; extract, from the first region, a first one or more descriptors from a first one or more feature points detected within the first region; analyze one or more properties of the first region to update a particular probability of the first region being selected; create a second probability distribution for the plurality of distinct regions according to the particular probability of the first region being selected; select, according to the second probability distribution, a second region from the plurality of distinct regions; extract, from the second region, a second one or more descriptors from a second one or more feature points detected within the second region; and reference at least the first one or more descriptors and the second one or more descriptors for detecting the target object.

Embodiments disclosed herein may relate to a machine readable non-transitory storage medium having stored therein program instructions that are executable by a processor to: receive an input image frame; create a plurality of distinct regions within the input image frame, wherein the plurality of distinct regions has a first probability distribution comprising of a particular probability of being selected for each respective region in the plurality of distinct regions; select, according to the first probability distribution, a first region from the plurality of distinct regions; extract, from the first region, a first one or more descriptors from a first one or more feature points detected within the first region; analyze one or more properties of the first region to update a particular probability of the first region being selected; create a second probability distribution for the plurality of distinct regions according to the particular probability of the first region being selected; select, according to the second probability distribution, a second region from the plurality of distinct regions; extract, from the second region, a second one or more descriptors from a second one or more feature points detected within the second region; and reference at least the first one or more descriptors and the second one or more descriptors for detecting the target object.

Embodiments disclosed herein may relate to an apparatus for implementing target object detection, the apparatus comprising: means for receiving an input image frame; means for creating a plurality of distinct regions within the input image frame, wherein the plurality of distinct regions has a first probability distribution comprising of a particular probability of being selected for each respective region in the plurality of distinct regions; means for selecting, according to the first probability distribution, a first region from the plurality of distinct regions; means for extracting, from the first region, a first one or more descriptors from a first one or more feature points detected within the first region; means for analyzing one or more properties of the first region to update a particular probability of the first region being selected; means for creating a second probability distribution for the plurality of distinct regions according to the particular probability of the first region being selected; means for selecting, according to the second probability distribution, a second region from the plurality of distinct regions; means for extracting, from the second region, a second one or more descriptors from a second one or more feature points detected within the second region; and means for referencing at least the first one or more descriptors and the second one or more descriptors for detecting the target object.

Other features and advantages will be apparent from the accompanying drawings and from the detailed description.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

In one embodiment, an Optimized Object Detection (OOD) system uses various techniques to focus computing resources towards extracting descriptors in areas of an image most likely to contain a target object. For example, instead of typically extracting a set number of descriptors immediately and determining pose after the completed extraction, OOD can split an image into regions and iteratively extract from each of the regions while increasing probabilities for regions determined to most likely include the target object. In one embodiment, areas that likely include the target object receive confidence "votes" that are processed in a probability distribution. According to the resulting probability distribution each iteration that includes descriptor extraction can focus on areas most likely to include the target object. In one embodiment, the voting system includes a center voting mechanism that uses vectors pointing to the target object center which may further optimize the focus on high probability regions during the descriptor extraction process.

Figure 1:
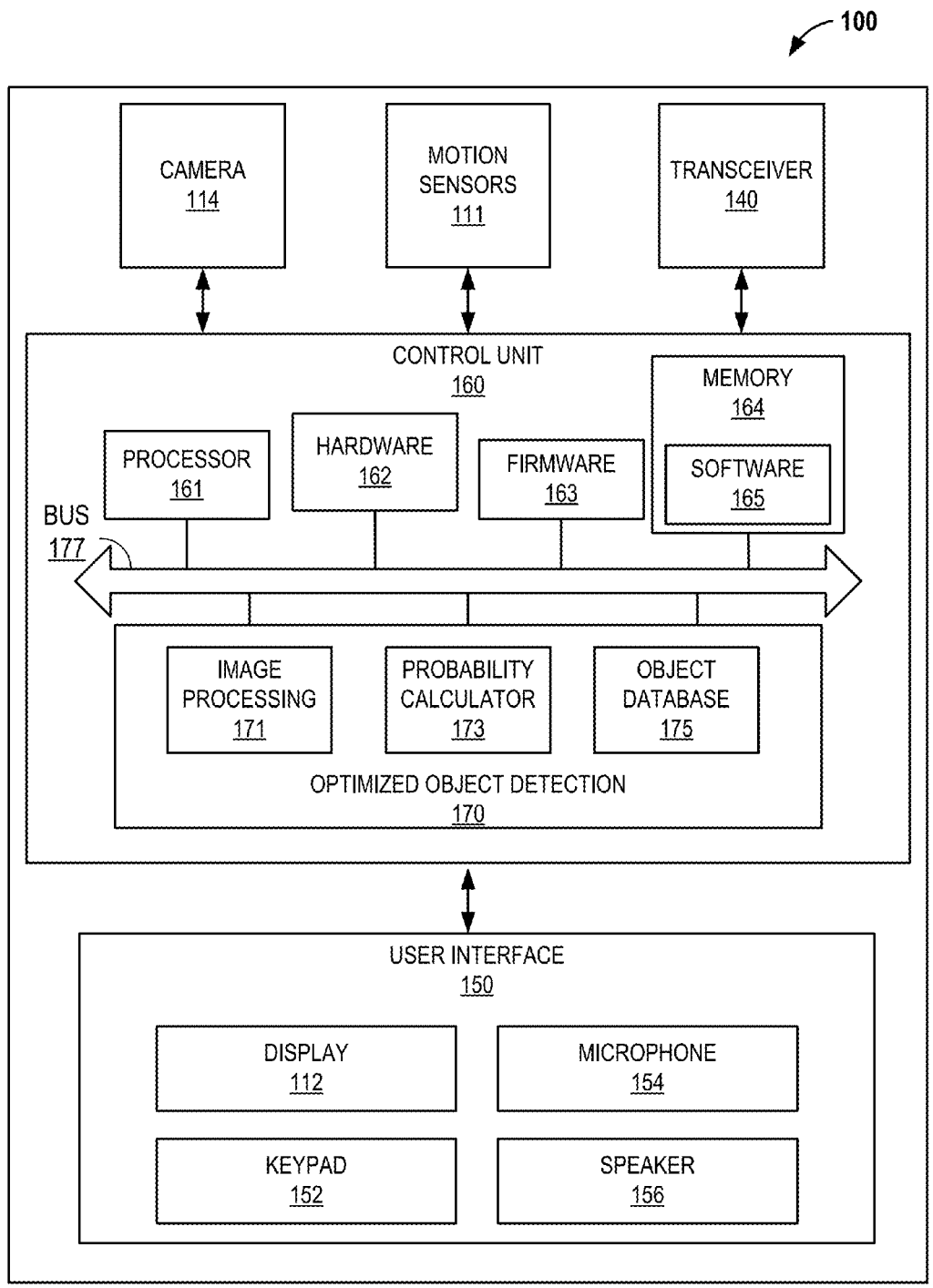
FIG. 1 is a block diagram of a system in which aspects of the invention may be practiced, in one embodiment.

FIG. 1 is a block diagram illustrating an exemplary system in which embodiments of the OOD may be practiced. The system may be a device 100, which may include a general-purpose processor 161, Image Processing module 171, Probability Calculator 173, Object Database 175, and a memory 164. The device 100 may also include a number of device sensors coupled to one or more buses 177 or signal lines further coupled to at least the Image Processing 171, Probability Calculator 173 modules, and Object Database 175. Modules 171 173, and 175 are illustrated separately from processor 161 and/or hardware 162 for clarity, but may be combined and/or implemented in the processor 161 and/or hardware 162 based on instructions in the software 165 and the firmware 163. Control unit 160 can be configured to implement methods of performing OOD as described herein. For example, the control unit 160 can be configured to implement functions of device 100.

Device 100 may be a: server, mobile device, wireless device, cell phone, augmented reality device (AR), personal digital assistant, wearable device (e.g., eyeglasses, watch, head wear, or similar bodily attached device), mobile computer, tablet, personal computer, laptop computer, data processing device/system, or any type of device that has processing capabilities.

In one embodiment, device 100 is a mobile/portable platform (e.g., client). Device 100 can include a means for capturing an image, such as camera 114 and may optionally include motion sensors 111, such as accelerometers, gyroscopes, electronic compass, or other similar motion sensing elements. Device 100 may also capture images on a front or rear-facing camera (e.g., camera 114). The device 100 may further include a user interface 150 that includes a means for displaying an augmented reality image, such as the display 112. The user interface 150 may also include a keyboard, keypad 152, or other input device through which the user can input information into the device 100. If desired, integrating a virtual keypad into the display 112 with a touch screen/sensor may obviate the keyboard or keypad 152. The user interface 150 may also include a microphone 154 and speaker 156, e.g., if the device 100 is a mobile platform such as a cellular telephone. Device 100 may include other elements unrelated to the present disclosure, such as a satellite position system receiver, power device (e.g., a battery), as well as other components typically associated with portable and non-portable electronic devices.

Device 100 may communicate via one or more wireless communication links through a wireless network that are based on or otherwise support any suitable wireless communication technology. For example, in some aspects, device 100 may be a client or server, and may associate with a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web sites, etc.

As described above, the device 100 can be a portable electronic device (e.g., smart phone, dedicated augmented reality (AR) device, game device, or other device with AR processing and display capabilities). The device implementing the AR system described herein may be used in a variety of environments (e.g., shopping malls, streets, offices, homes or anywhere a user may use their device). Users can interface with multiple features of their device 100 in a wide variety of situations. In an AR context, a user may use their device to view a representation of the real world through the display of their device. A user may interact with their AR capable device by using their device's camera to receive real world images/video and process the images in a way that superimposes additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

Figure 2:
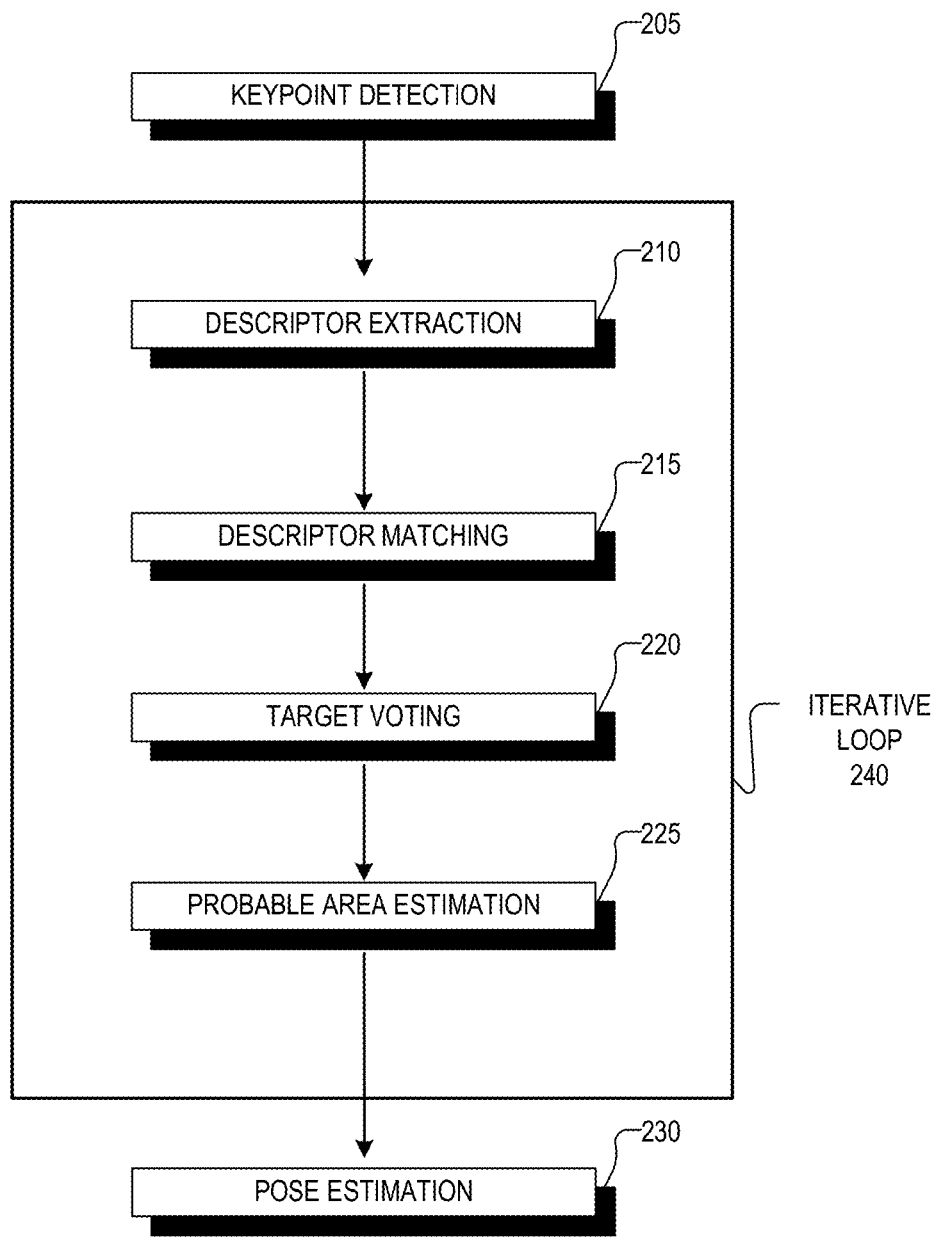
FIG. 2 illustrates an Optimized Object Detection (OOD) workflow overview, in one embodiment.

FIG. 2 illustrates an OOD workflow overview, in one embodiment. As illustrated in FIG. 2, the embodiment (e.g., OOD) may perform or trigger keypoint detection at block 205.

At block 210, the embodiment may perform descriptor extraction. For example, OOD may extract descriptors from features within camera images. A feature (e.g., feature point or interest point) as used herein is as an interesting or notable part of an image. Feature detection may be an image processing operation to examine every pixel to determine whether a feature exists at a particular pixel. Feature detection may process an entire captured image or, alternatively certain portions or parts of the captured image. The descriptors extracted from the features of the captured image may represent distinct points along three-dimensional space (e.g., coordinates on axes X, Y, and Z) and every feature point may have an associated feature location. For each captured image or video frame, once features have been detected, a local image patch around the feature can be extracted. Features may be extracted using a well-known technique, such as Scale Invariant Feature Transform (SIFT), which localizes features and generates their descriptions. If desired, other techniques, such as Speed Up Robust Features (SURF), Gradient Location-Orientation histogram (GLOH), Normalized Cross Correlation (NCC) or other comparable techniques may be used. When the number of extracted features for an image is determined to exceed a threshold (e.g., 100 point features or other number of points) the image and features can be saved as a keyframe.

At block 215, the embodiment performs descriptor matching. The extracted descriptors for features may either match or fail to match (i.e., are the same or correspond to) the features of previously captured images. For example, the previously captured images may be images stored in an object database.

At block 220, the embodiment performs target voting. For example, target voting may include segmenting an image into regions and separately voting or determining confidence that a target object is present within the respective region. In some embodiments, direction to center vectors are determined within a respective region and votes or confidence for a region occurs when the vectors intersect each other, or intersect the respective region. In other embodiments, votes or confidence is increased when an extracted descriptor within the region matches the descriptor of the target object in a database. In other embodiments, target voting may include center voting as described in greater detail in FIG. 7 below.

At block 225, the embodiment performs probable area estimation. For example, using a biased Monte Carlo probability distribution, votes for high likelihood regions will increase the probability of selecting those areas in a future descriptor extraction iteration. As illustrated blocks 210-225 may iterate for two or more iterations. For example, in response to voting and updating probabilities, additional descriptors are extracted and matched with a reference database so that additional voting and updating of probabilities may occur. In one embodiment, iterative loop 240 may repeat until a threshold number of descriptors are extracted (e.g., per region or per image), or the object is detected/not-detected within a threshold confidence.

At block 230, the embodiment estimates pose. In one embodiment, in response to detecting the object with high confidence OOD initiates pose estimation of the object. In some embodiments, estimating pose, OOD triggers and/or sends appropriate data for tracking for the object to a tracking system (e.g., SLAM).

Figure 3A:
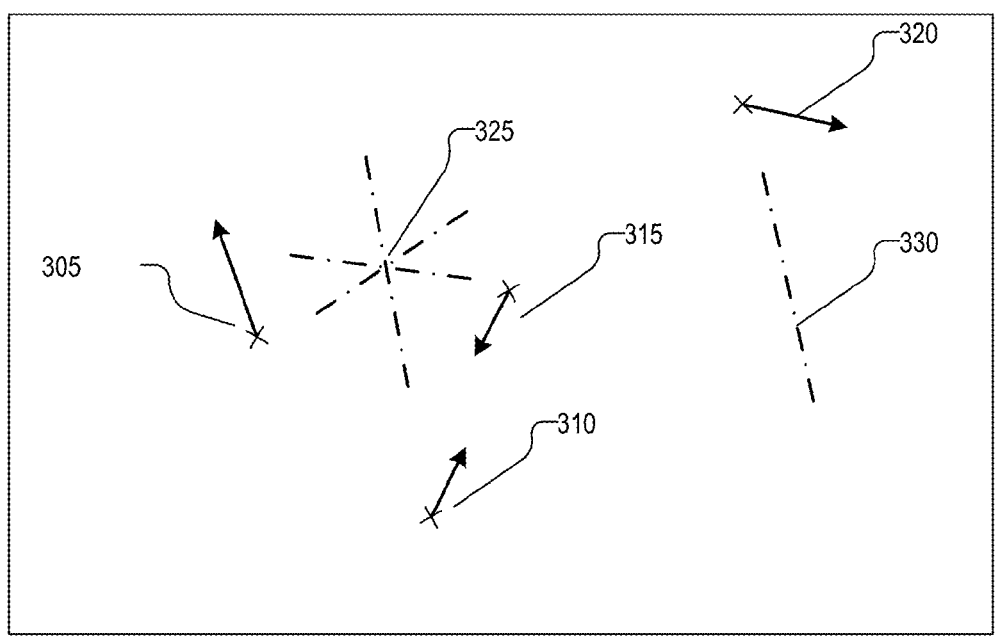
FIG. 3A illustrates direction vectors associated with features within an image, in one embodiment.

FIG. 3A illustrates direction vectors associated with features within an image, in one embodiment. As illustrated in FIG. 3A, for a given image and viewpoint, there may be a number of descriptors that do not correspond to the target object (e.g., because the target object is not present or is unable to be detected for other reasons). Therefore, as illustrated, a direction vector 320 not corresponding to the target object does not pass by a target object center 325 and instead may be closer to an unrelated object center 330. Additionally vectors which are not determined according to a dominant direction (e.g., 305-315) may not intersect at the actual target object center 325.

Figure 3B:
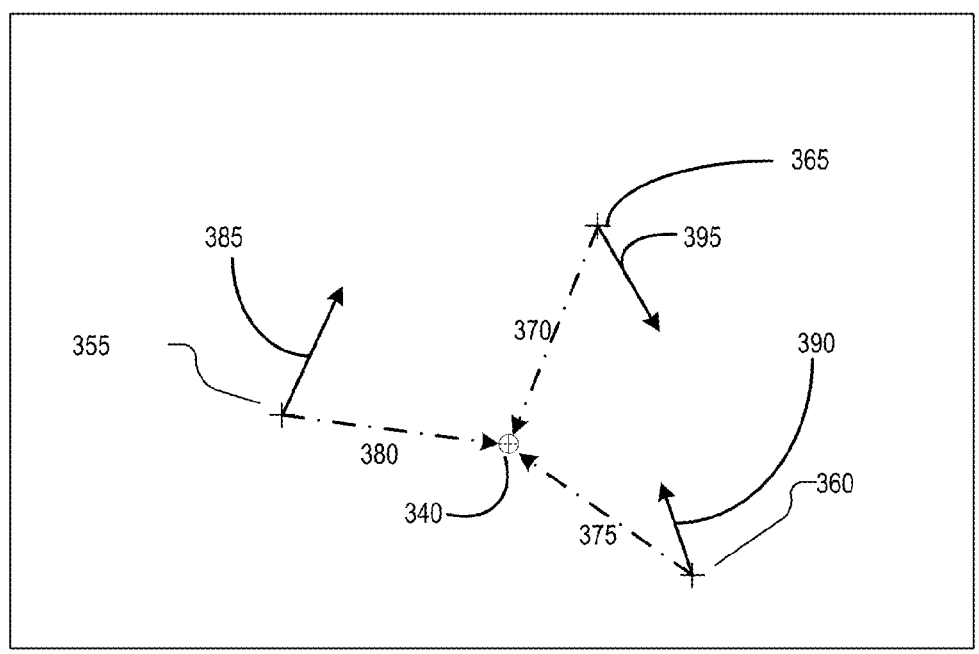
FIG. 3B illustrates direction vectors associated with features within an image, in another embodiment.

FIG. 3B illustrates direction vectors associated with features within an image, in another embodiment. FIG. 3B illustrates feature points 355, 360, and 365 having dominant direction vectors 385, 390, and 395 respectively. From the dominant direction vectors, and a reference database, an object center 340 may be estimated for each of the feature points. Direction vectors 370, 375, and 380 point to object center 340 and have a length determined according to scale. For the image (e.g., keyframe) illustrated in FIG. 3B, the object center is part of the database and all the features in the database correspond to the object to detect. In one embodiment, all of the orientation vectors pass by the center (e.g., because they are defined to do so).

Figure 4:
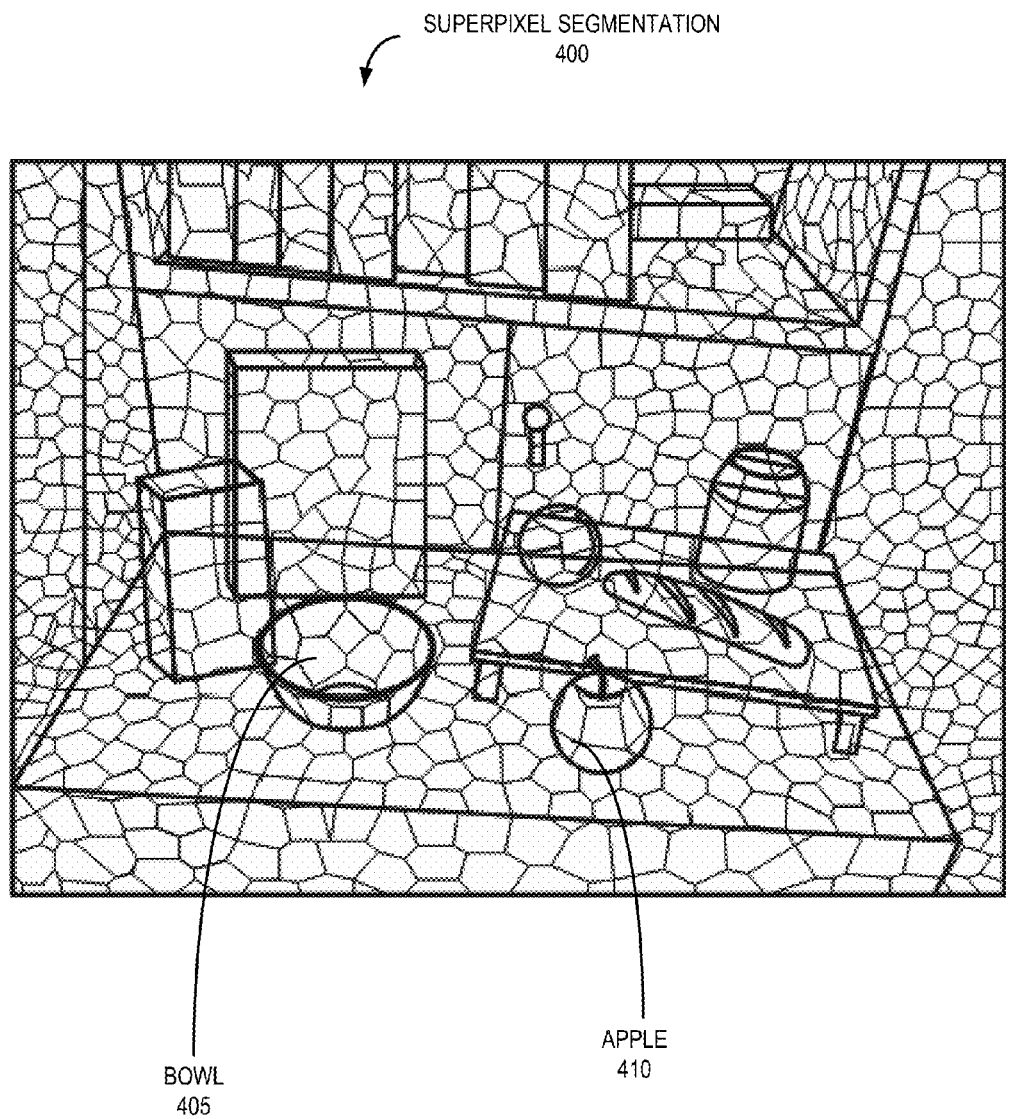
FIG. 4 illustrates superpixel region segmentation of an image, in one embodiment.

FIG. 4 illustrates superpixel region segmentation of an image, in one embodiment. In some embodiments, superpixel regions 400 may provide enhanced object selection regions by better conforming to object edges than an equal weighting grid. For example, bowl 405 and apple 410 have regions that approximately conform to the actual shape of the respective object. Therefore, through the use of superpixel regions OOD can initialize with regions that are optimized for object boundaries.

Figure 5A:
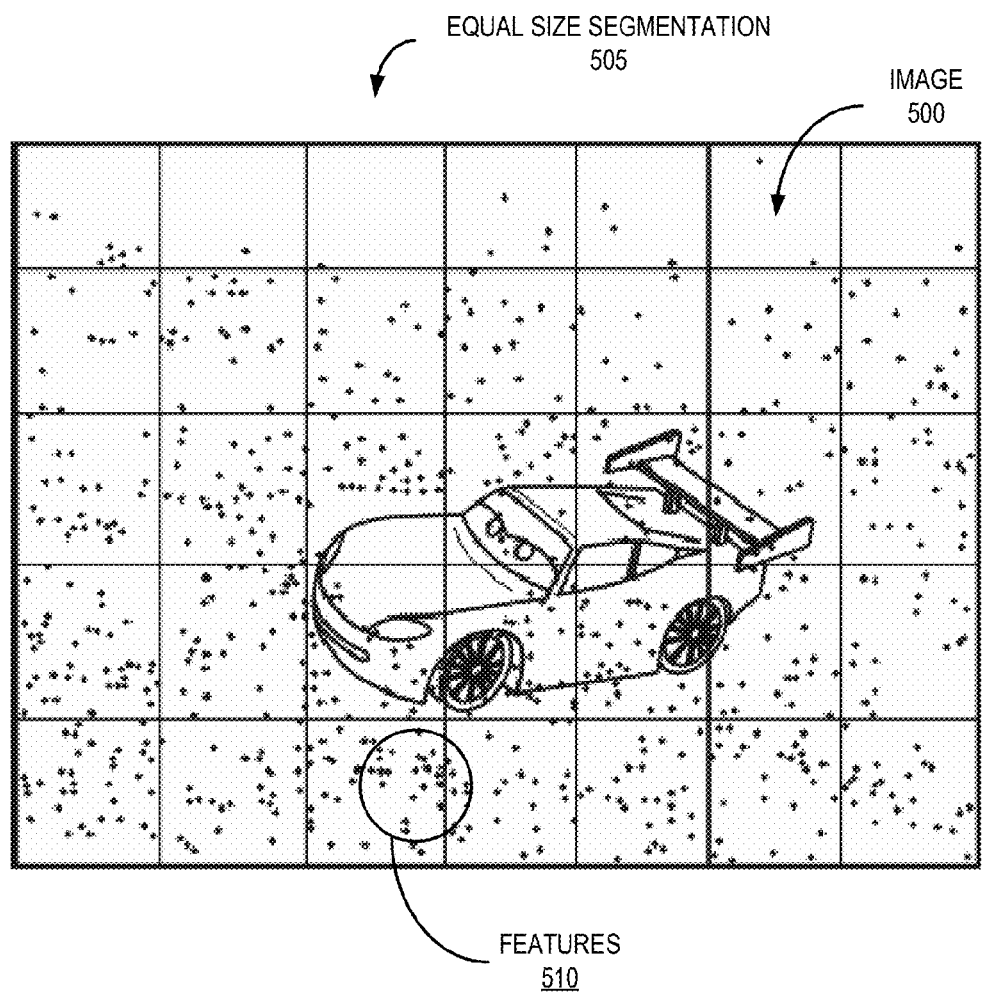
FIG. 5A illustrates an initialized equal sized region segmentation of an image with feature points, in one embodiment.

FIG. 5A illustrates an initialized equal sized region segmentation of an image with feature points, in one embodiment. For example, image 500 is segmented into a grid with each segment of the grid having equal size. In other embodiments, the segments may be different shapes other than square or rectangle. In yet other embodiments, other shapes of non-equal size may be used to segment an image.

Figure 5B:
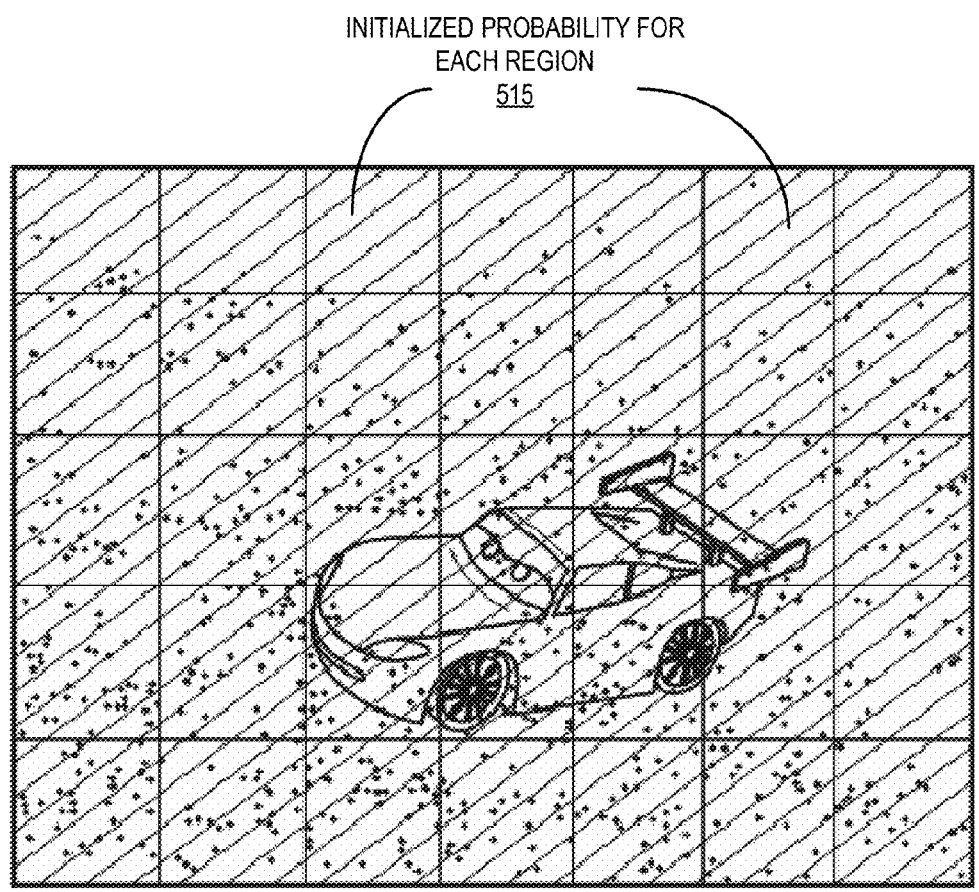
FIGS. 5B-5D illustrate region segmentation of an image with adjusted probability weighting for selected regions, in one embodiment.
Figure 5C:
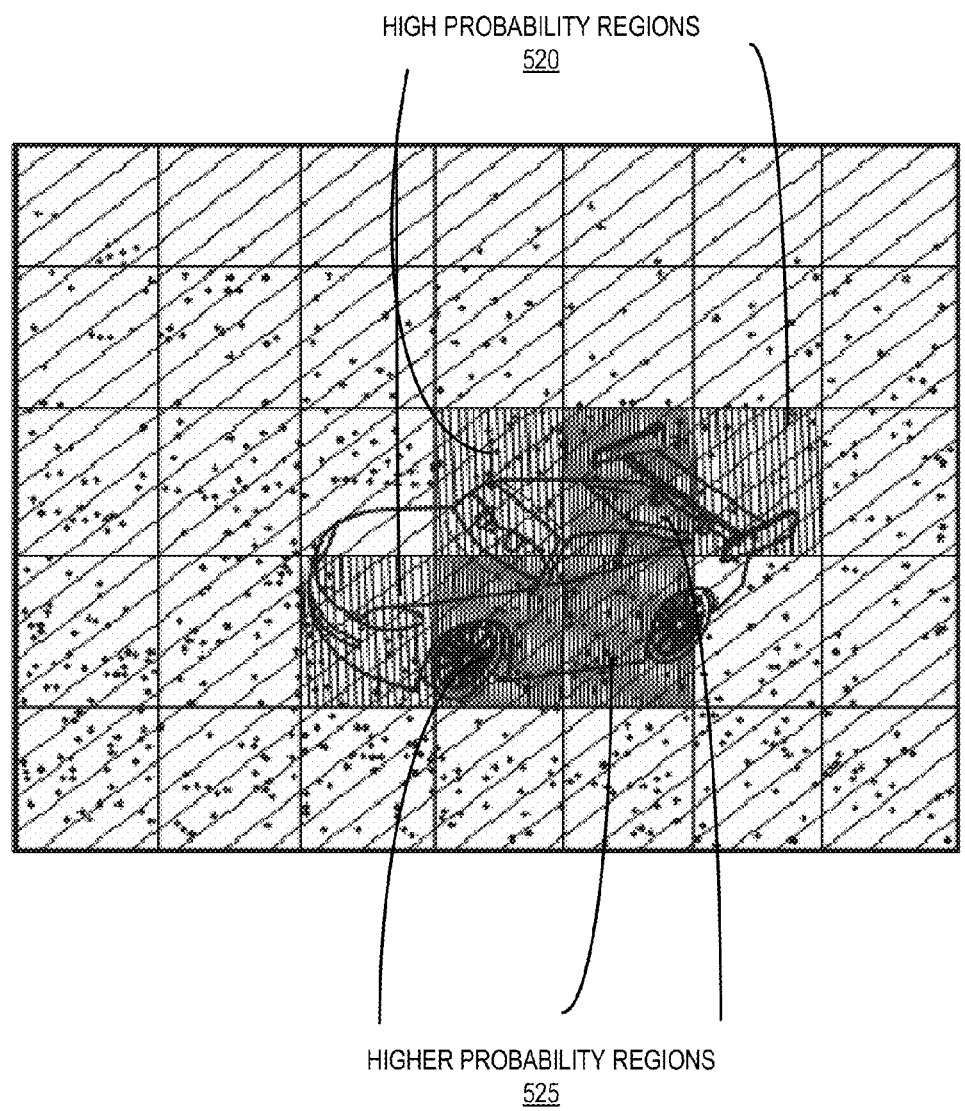
Figure 5D:
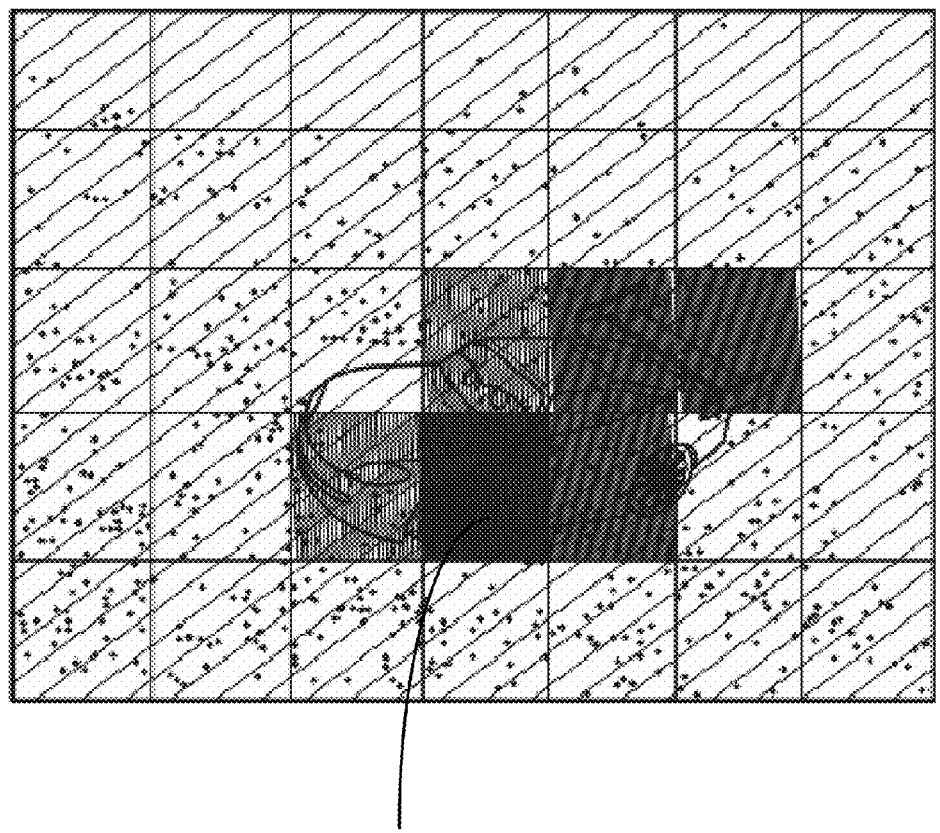

FIGS. 5B-5D illustrate region segmentation of an image with adjusted probability weighting for selected regions, in one embodiment. FIG. 5B illustrates equal sized region segmentation of an image with an initial probability weighting equal for all regions (e.g., illustrated by uniform shading 515), in one embodiment. For example, as illustrated, all regions within the grid may begin at time $t_0$ with an equal probability of being selected. In other words, OOD may have no greater confidence for detecting an object in any one region compared with any other region.

FIG. 5C illustrates (e.g., by the darkened shaded regions 520 and 525) voting at time $t_1$ (e.g., which indicates some time period or some number of iterations after initialization) for the target object (car) in particular regions has increased the likelihood of continuing to extract descriptors within the certain higher probability regions. At time $t_n$ illustrated by FIG. 5D areas of the car (target object) receive additional votes or confidence, represented by the increased shading particular regions/segments. For example, as illustrated, the highest probability region 530 is represented with the darkest shading for the regions.

Figure 6:
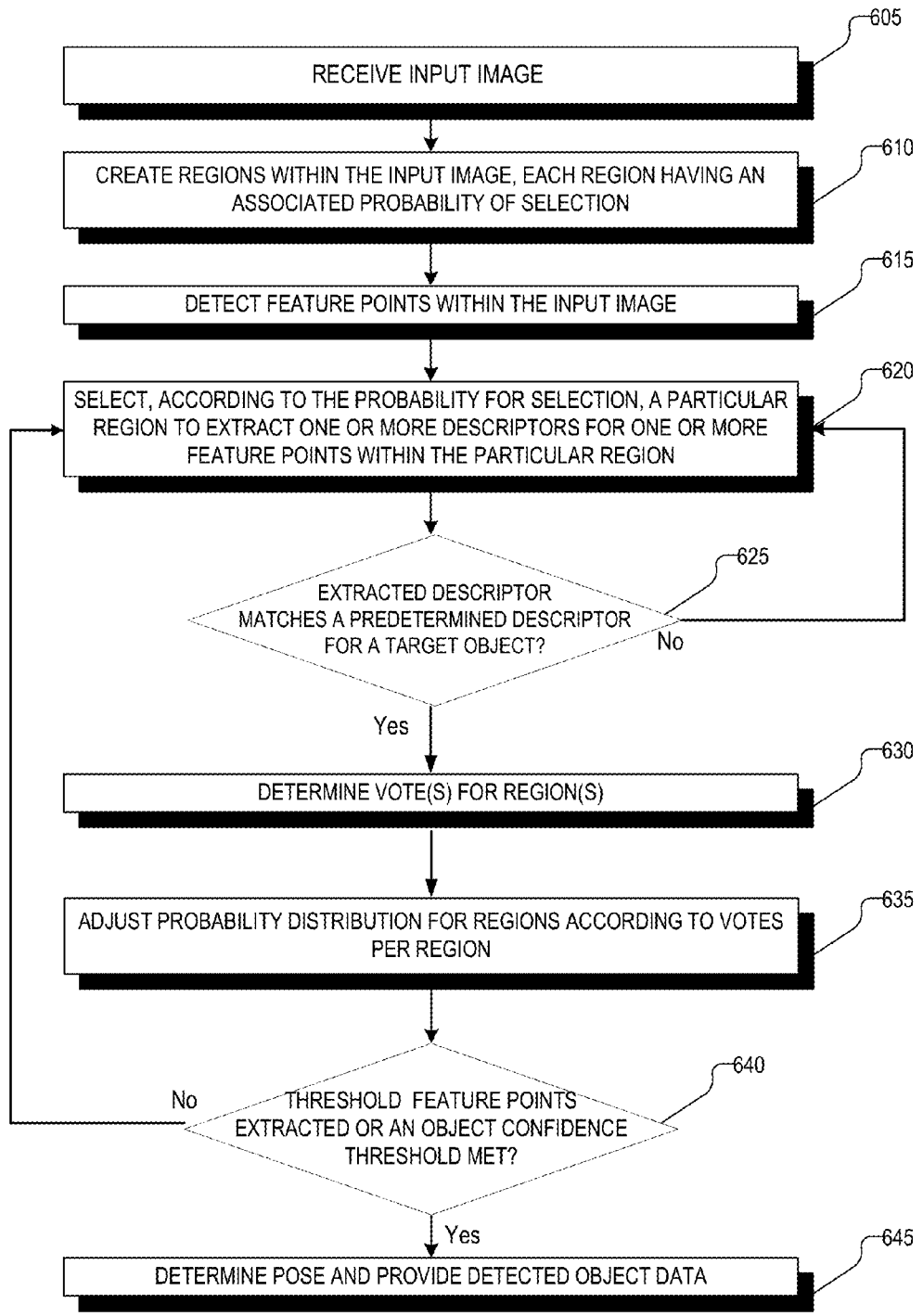
FIG. 6 illustrates an OOD workflow overview, in another embodiment.

FIG. 6 illustrates an OOD workflow overview, in one embodiment. At block 605, the embodiment (e.g., OOD) receives an input image.

At block 610, the embodiment creates regions within the input image, each region having an associated probability of selection. For example, the image may be initialized with an equal probability of selecting each region. In some embodiments, the arrangement of the regions may be superpixel based, equal sized, or based on a depth map. Other region/ segment arrangements are also possible.

At block 615, the embodiment detects feature points within the input image. In some embodiments, a threshold number of feature points are detected and used to start the OOD process. The number of feature points to detect may be determined per image or per region. In some embodiments, OOD receives a keyframe image that includes detected feature points.

At block 620, the embodiment selects, according to the probability for selection, a particular region to extract one or more descriptors for one or more feature points within the particular region. In some embodiments, before a first descriptor extraction all regions may have an equal probability of being selected. In other embodiments, features are ranked according to strength and stronger features receive a higher probability of selection. If all regions are equally probable for section, during a first iteration, OOD may randomly select one or more regions to extract descriptors. In some embodiments, OOD may begin by extracting two (or some other configurable number) descriptors within each region or a number from just one first region and then proceed to determining whether the descriptors have a match at block 625. In some embodiments subsequent iterations the number of descriptors extracted may vary depending on the number of votes for the particular region. For example, OOD may determine that once a threshold number of votes are received for a region, that all feature points should be used to extract descriptors within the region. In other embodiments, the number of extracted descriptors remains constant for each iteration.

At block 625, the embodiment determines whether the extracted descriptor matches a predetermined descriptor for a target object. If there is a match, the embodiment continues to block 630, otherwise the embodiment returns to block 620.

At block 630, the embodiment determines vote(s) for region(s).

In one embodiment, for each descriptor matching a reference descriptor, OOD determines a dominant direction vector for the descriptor's associated feature point and determines a direction and distance vector relative to the dominant direction. In response to determining a direction and distance vector OOD can increment a particular region vote when the region contains (e.g., bounds, encapsulates, etc.) two intersecting direction vectors. In some embodiments, the direction and distance vector may extend beyond the particular region, in which case if the intersection of the newly formed direction and distance vector intersects a second region other than the particular region, the second region may receive a vote.

In one embodiment, a particular region (e.g., current, or currently selected) receives a vote or increased confidence when a direction vector intersects the particular region. For example, if a newly created direction and distance vector intersects with a section of the particular region, the particular region receives a vote. In some embodiments, if the newly created direction and distance vector intersects with a section/portion of a second (or third, or more) region(s) the respective region(s) receive a vote. For example, the second or more region(s) may be adjacent or nearby to the particular region containing the descriptor when they are intersected by a region. In some embodiments, each respective region intersected by the direction and distance vector will receive a vote for the respective region. Therefore, in some embodiments, creating/determining a single direction and distance vector may cause multiple regions to receive votes.

In one embodiment for a particular (e.g., current, or currently selected from block 620) region, in response to determining the descriptor matches a predetermined descriptor in a reference database a vote is counted for the particular region.

At block 635, the embodiment adjusts a probability distribution for regions according to votes per region. For example, OOD can recalculate probabilities according to all the newly acquired votes (if any) from block 630.

At block 640, the embodiment determines whether a threshold number of feature points are extracted or an object confidence threshold has been met. If either or both tests are met, the embodiment continues to a next image and provides data for pose estimation if possible. Otherwise, the embodiment continues to extract descriptors by selecting regions according to probability. In some embodiments, after estimating pose OOD may ignore the detected object region for subsequent images since tracking of the object may occur in a separate dedicated process. Furthermore, the probability distribution for a first image may be carried forward to a second image. After a threshold time period OOD may fully reset all region probabilities.

At block 645, the embodiment determines pose and provides detected object data. For example, pose may be estimated with Random sample consensus (RANSAC) and three point poses using the subset of correspondences that fit the hypothesis (i.e. votes for the object center).

Figure 7:
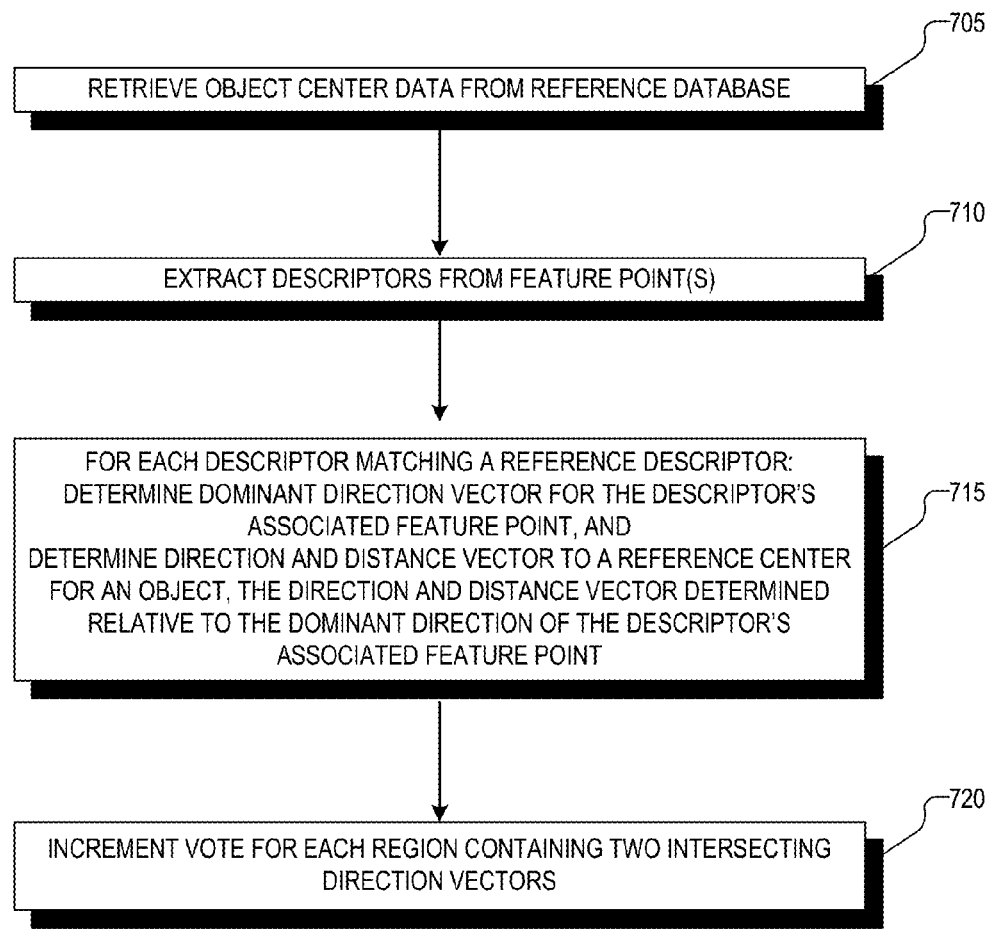
FIG. 7 illustrates an object center voting workflow, in one embodiment.

FIG. 7 illustrates an object center voting workflow, in one embodiment. At block 705, the embodiment (e.g., OOD) retrieves object center data from a reference database.

At block 710, the embodiment extracts descriptors for one or more feature points within the image (e.g., within a selected region as described in FIG. 6).

At block 715, for each descriptor matching a reference descriptor, the embodiment determines a dominant direction vector for the descriptor's associated feature point and determines a direction and distance vector relative to the dominant direction.

At block 720, the embodiment increments a region vote when a region contains two intersecting direction vectors. In some embodiments, votes represent a confidence that a region contains the target object and probabilities may be adjusted to increase or decrease a likelihood that a region is selected for a next iteration of descriptor extractions. In some embodiments, a region receives a vote or increased confidence when a direction vector intersects a respective region (in contrast to voting when intersecting another direction vector).

Figure 8A:
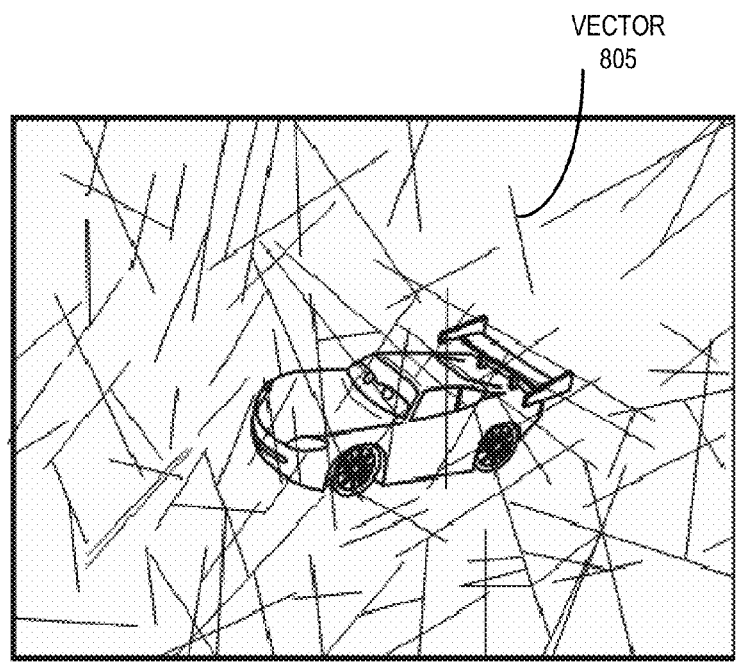
FIG. 8A-C illustrate visual representations of object center voting workflow, in particular embodiments.
Figure 8B:
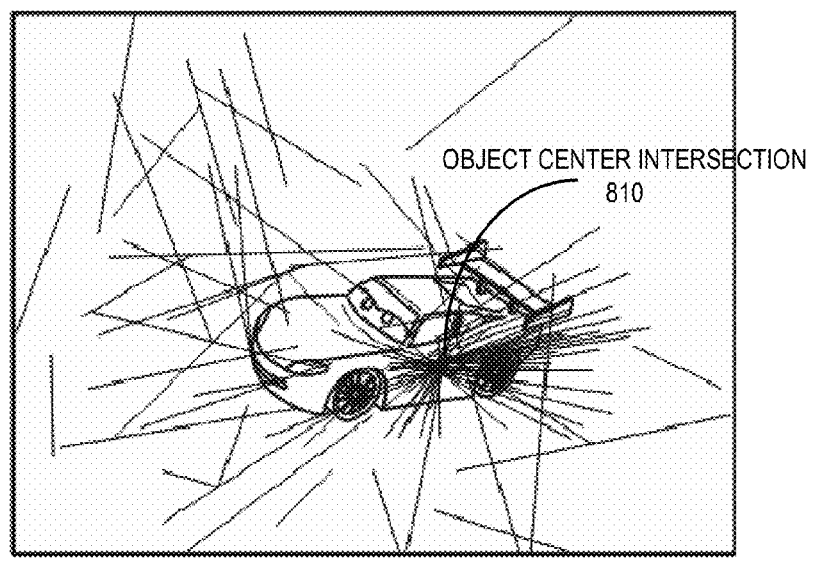
Figure 8C:
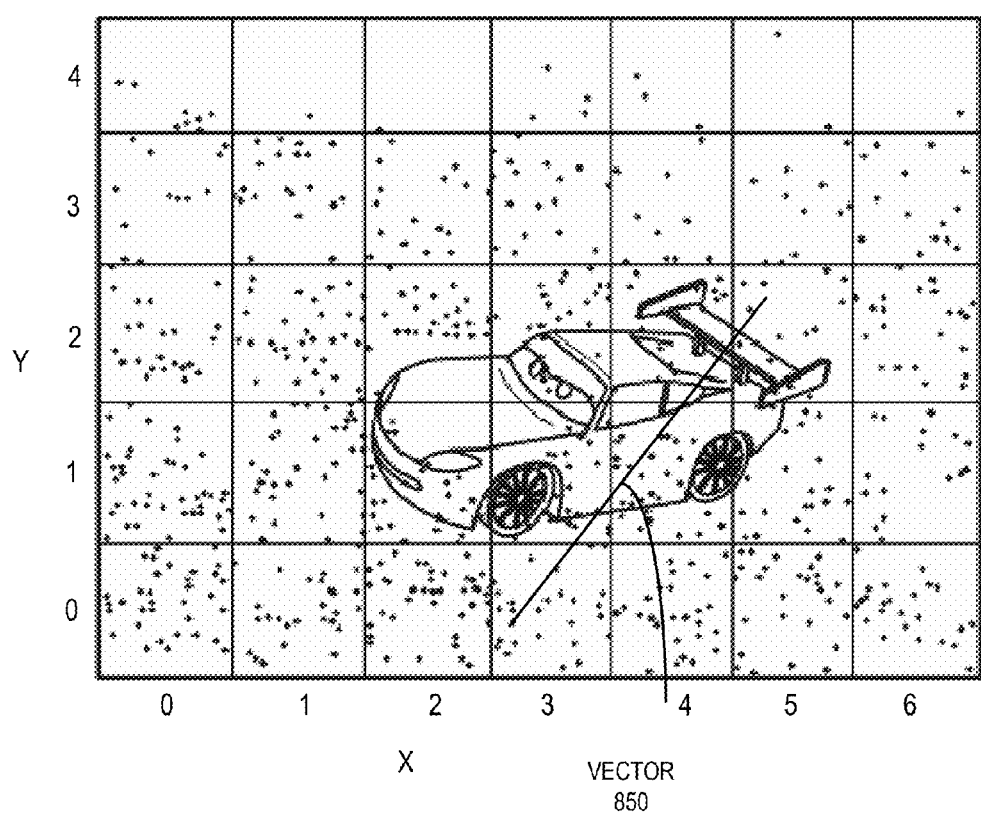

FIG. 8A-C illustrate visual representations of object center voting workflow, in particular embodiments. FIG. 8A illustrates object center voting for other objects in a database other than the target object car. FIG. 8B illustrates object center voting for the target object car. As illustrated in FIG. 8B, a clear object center intersection near the door handle of the car is determined as shown by the strong clustering of vectors. As illustrated in FIG. 8C, OOD may also use intersections of regions for voting or adjusting confidence of one or more regions. For example, a vector which crosses a region may increase the vote or confidence of that particular region (e.g., vector intersection at region 850). In some embodiments, multiple regions may be affected when a vector crosses these multiple regions. For example, vector 850 intersects region illustrated in region (3,0) as well as (3,1), (4,1), (4,2), and (5,2). Therefore, in some embodiments, the five regions vector 850 intersects/crosses may each receive a vote.

Figure 9:
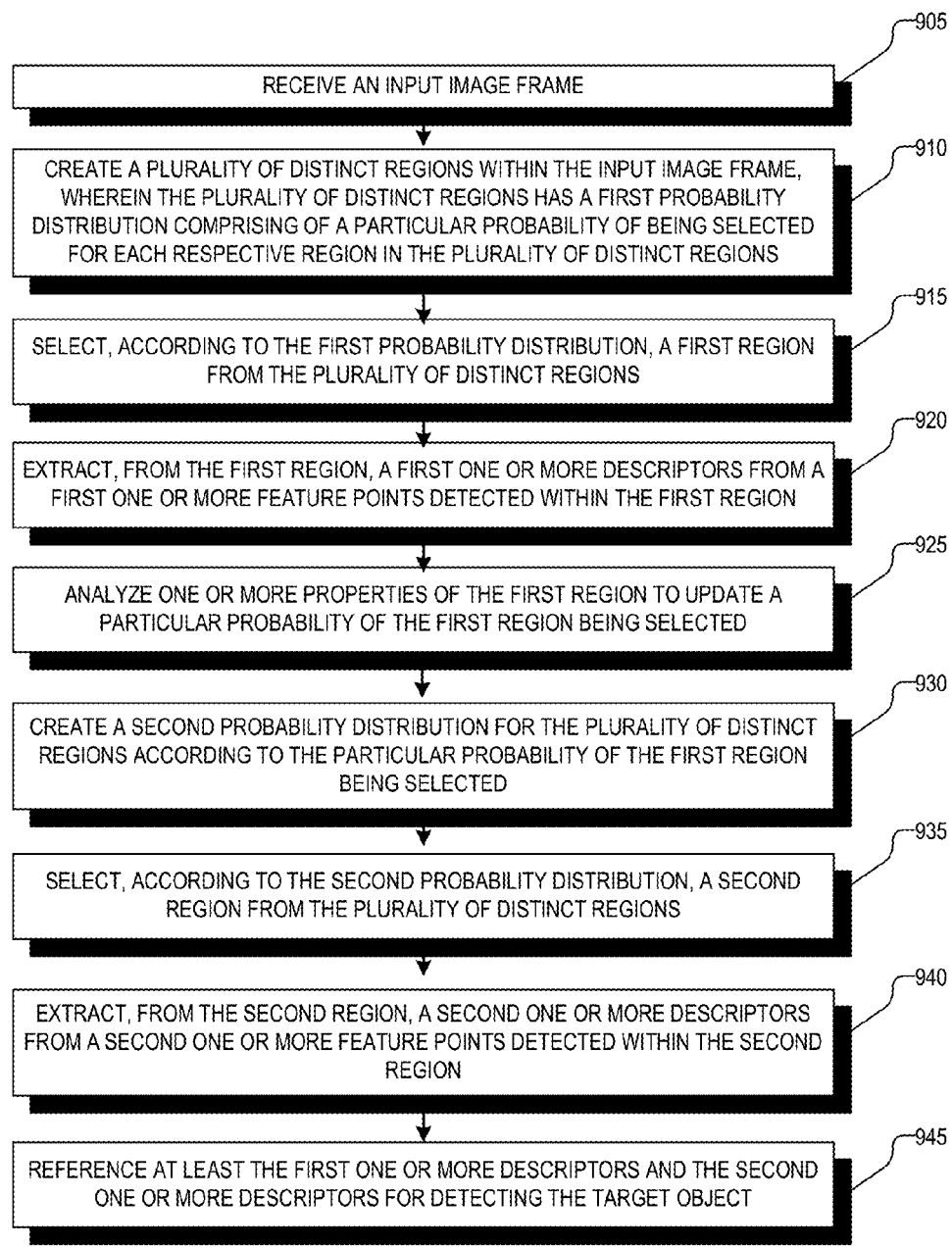
FIG. 9 illustrates an OOD workflow, in another embodiment.

FIG. 9 illustrates an OOD workflow, in another embodiment. At block 905, the embodiment (e.g., OOD implemented by device 100) receives an input image frame. For example, the input image frame may be an image from camera 114.

At block 910, the embodiment creates a plurality of distinct regions within the input image frame, wherein the plurality of distinct regions has a first probability distribution comprising of a particular probability of being selected for each respective region in the plurality of distinct regions. For example, each region may be initialized with an starting (e.g., equal) probability of being selected. In one embodiment, the size of each of the plurality of regions is determined according to one of: equal area split (e.g., squares, rectangles, or other geometric shape), superpixel segmentation (e.g., segmentation taking into account image content), or a depth map (e.g., object estimates may be detected from grouping elements having a similar depth together in an image).

At block 915, the embodiment selects, according to the first probability distribution, a first region from the plurality of distinct regions. For example, the first probability may be equal for all regions and the first selection may be a random selection from any one of the regions. If the first probability is weighted towards a particular region, that particular region is more likely to be selected as a first (selected) region.

At block 920, the embodiment extracts, from the first region, a first one or more descriptors from a first one or more feature points detected within the first region. For example, OOD may start with one feature point or may select a set of features to extract. In one embodiment, the threshold number of descriptors to extract is determined according to one or both of: a per input image descriptor threshold, or per region descriptor threshold. For example, given a maximum number of descriptors that may be extracted for an image, a number of descriptors per region may be determined In some embodiments, each region has a maximum number of descriptors that will be extracted before making a determination of whether an object is detected or not detected within the region or within the image.

At block 925, the embodiment analyzes one or more properties of the first region to update a particular probability of the first region being selected. For example, OOD makes a determination of likelihood that the particular (e.g., currently selected) region contains the target object. If OOD determines (e.g., through one or more properties) that the target object may be at least in part within the region, OOD can mark the region with a vote or other determination of increased confidence in the region. In some embodiments, analyzing the one or more properties includes: calculating, for one or more feature points in a respective region, a direction vector representing a scale and a direction to a center of the target object, and increasing probability of selection for the respective region when two or more direction vectors within the respective region intersect. In some embodiments, analyzing the one or more properties includes: calculating, for one or more feature points in a respective region, a direction vector representing a scale and a direction to a center of the target object, and increasing probability of selection for the respective region when the direction vector intersects the respective region. In some embodiments, analyzing the one or more properties includes: matching the extracted one or more descriptors to a predetermined reference descriptor associated with the target object, and increasing probability of selection for the respective region in response to the matching.

At block 930, the embodiment creates a second probability distribution for the plurality of distinct regions according to the particular probability of the first region being selected. For example, OOD can read the current votes or other indication of confidence from the first region and recalculate the probability distribution for all regions according to the vote or increased confidence of the first region. As one example, if a particular region has a new vote, that particular region will be more likely (compared to previous iterations) to be selected in a next iteration.

At block 935, the embodiment selects, according to the second probability distribution, a second region from the plurality of distinct regions. The second region may be the same as the first region or may be a different region.

At block 940, the embodiment extracts, from the second region, a second one or more descriptors from a second one or more feature points detected within the second region.

At block 945, the embodiment references at least the first one or more descriptors and the second one or more descriptors for detecting the target object.

In some embodiments, OOD continues, according to updated probability distributions for the plurality of regions: selecting of regions, extracting of descriptors, and analyzing of one or more properties until detecting one or both of: a threshold number of descriptors are extracted, a threshold confidence is met for confirmation of detecting the target object, or a threshold confidence is met for determining the target object is not present. For example, OOD will perform descriptor extraction, then voting for one or more regions, and then updating the probabilities of regions during one iteration or cycle. The extraction, voting, and updating iterations may continue until an object is detected, or OOD determines an object is not likely within the current image frame. As OOD iterates through an regions of an image frame, the voting mechanism will focus computing resources on regions most likely to include features of the target object, while also, as a consequence, avoiding areas that the target object is unlikely to be found. Therefore, computing resources may be focused on high confidence areas of an image frame.

In some embodiments, in response to meeting a threshold confidence for detecting the target object, OOD determines the target object pose and ignores an area comprising the detected target object when performing additional target object detection in a next input image. For example, if a target object is detected, the target object may be passed off to a dedicated tracker that will track the target in future frames. Therefore, for these future frames, OOD can focus on other areas of the image not covered by the object tracking system, and potentially discover additional objects of interest.

In some embodiments, in response to meeting a threshold confidence for determining the target object is not present: OOD applies a latest probability distribution associated with the plurality of regions to a next input image, and resets all probabilities associated with the plurality of regions after one or both of: a threshold number of input images, or set amount of time. For example, in response to failing to detect an object, OOD may continue using a current probability distribution for a set number of frames or a set time period. After the set number of frames or set time period expires, OOD may reset probabilities for all regions so that a new analysis of the an environment may begin. Therefore, any erroneous data that may have misled OOD in detecting a target object can be corrected after a threshold time limit or threshold number of images.

In some embodiments, OOD increases the probability of selection for one or more adjacent regions to a respective region in response to having confidence for the respective region. For example, OOD can determine based on an increased confidence of one region that nearby regions have an increased likelihood of containing the target object.

As described above, device 100 can be a portable electronic device (e.g., smart phone, dedicated augmented reality (AR) device, game device, wearable device such as eyeglasses, or other device with AR processing and display capabilities). The device implementing the AR system described herein may be used in a variety of environments, such as shopping malls, streets, rooms, or anywhere a user may take a portable device. In an AR context, a user may use the device 100 to view a representation of the real world through the display of their device. A user may interact with their AR capable device by using their device's camera to receive real world images/video and superimpose or overlay additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

Movement of the device 100 and camera 114 can cause the display to update, in real-time, an augmentation of a target (e.g., one or more objects or scenes). With movement of the device away from an initial reference image position, the device can capture additional images from alternate views. After extracting features and triangulating from additional keyframes, increased accuracy of the augmentation can be achieved (e.g., borders around an object may fit more precisely, the representation of the object in the scene will appear more realistic, and target placement can be more accurate relative to the camera pose).

In one embodiment, an object or graphic may be inserted or integrated into a video stream (or image) captured by the camera 114 and displayed on display 112. OOD may optionally prompt the user for additional information to augment the target. For example, the user may be able to add user content to augment the representation of the target. User content may be an image, 3D object, video, text, or other content type that can be integrated with, or overlaid with, or replace a representation of the target.

The display may update in real-time with seamless tracking from the original scene. For example, text on a sign may be replaced with alternate text, or a 3D object may be strategically placed in the scene and displayed on device 100. When the user changes the position and orientation of the camera 114, the graphic or object can be adjusted or augmented to match the relative movement of the camera 114. For example, if a virtual object is inserted into an augmented reality display, camera movement away from the virtual object can reduce the size of the virtual object relative to the distance traveled by the camera 114. For example, taking four steps back from a virtual object should cause a greater reduction in size of the virtual object compared to taking a half step back from the virtual object, all other variables being equal. Motion graphics or animation can be animated within the scene represented by OOD. For example, an animated object can "move" within a scene depicted in the augmented reality display.

A person of skill in the art will recognize that embodiments described herein can be implemented in ways other than AR (e.g., robot positioning).

OOD may be implemented as software, firmware, hardware, module or engine. In one embodiment, the previous OOD description may be implemented by the general purpose processor 161 in device 100 to achieve the previously desired functions (e.g., methods related to FIG. 2, FIG. 6, FIG. 7, and FIG. 9). In one embodiment, OOD may be implemented as an engine or module. In other embodiments, features of one or more of the described subcomponents may be combined or partitioned into different individual components, modules or engines.

The teachings herein may be incorporated into (e.g., implemented within or performed by) a variety of apparatuses (e.g., devices). In one embodiment, OOD can be implemented as an engine or module executed by a processor to receive images or video as input. One or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a user I/O device, a computer, a server, an entertainment device, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network through transceiver 140 (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one embodiment, camera 114 produces an input image frame for OOD as described herein. Furthermore, as an illustrative example, memory 164 may store instructions which when executed by processor 161, can create regions in the input image, can select according to probability, a particular region, can analyze properties of regions, and update probabilities for the regions.

In one or more exemplary embodiments, the functions or modules described may be implemented in hardware (e.g., hardware 162), software (e.g., software 165), firmware (e.g., firmware 163), or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer, or data processing device/system. By way of example, and not limitation, such non-transitory computer-readable media can comprise Random Access Memory (RAM), Read Only Memory (ROM), Electrically Erasable Programmable Read-Only Memory (EEPROM), Compact Disc Read Only Memory (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for detecting a target object, the method comprising:
   receiving an input image frame;
   creating a plurality of distinct regions within the input image frame, wherein the plurality of distinct regions has a first probability distribution comprising of a particular probability of being selected for each respective region in the plurality of distinct regions;
   selecting, according to the first probability distribution, a first region from the plurality of distinct regions;
   extracting, from the first region, a first one or more descriptors from a first one or more feature points detected within the first region;
   analyzing one or more properties of the first region to update a particular probability of the first region being selected;
   creating a second probability distribution for the plurality of distinct regions according to the particular probability of the first region being selected;
   selecting, according to the second probability distribution, a second region from the plurality of distinct regions;
   extracting, from the second region, a second one or more descriptors from a second one or more feature points detected within the second region; and
   referencing at least the first one or more descriptors and the second one or more descriptors for detecting the target object.

2. The method of claim 1, further comprising:
   continuing, according to updated probability distributions for the plurality of regions, the selecting of regions, extracting of descriptors, and analyzing of one or more properties until detecting one or both of:
   a threshold number of descriptors are extracted,
   a threshold confidence is met for confirmation of detecting the target object, or
   a threshold confidence is met for determining the target object is not present.

3. The method of claim 1, wherein the analyzing the one or more properties comprises:
   calculating, for one or more feature points in a respective region, a direction vector representing a scale and a direction to a center of the target object determined from a reference database; and
   increasing probability of selection for the respective region when two or more direction vectors within the respective region intersect.

4. The method of claim 1, wherein the analyzing the one or more properties comprises:
   calculating, for one or more feature points in a respective region, a direction vector representing a scale and a direction to a center of the target object; and increasing probability of selection for the respective region when the direction vector intersects the respective region.

5. The method of claim 1, wherein the analyzing the one or more properties comprises:
matching the extracted one or more descriptors to a predetermined reference descriptor associated with the target object; and
increasing probability of selection for the respective region in response to the matching.

6. The method of claim 1, wherein, in response to meeting a threshold confidence for detecting the target object:
determining the target object pose; and
ignoring an area comprising the detected target object when performing additional target object detection in a next input image.

7. The method of claim 1, wherein, in response to meeting a threshold confidence for determining the target object is not present:
applying a latest probability distribution associated with the plurality of regions to a next input image; and
resetting a probability distribution associated with the plurality of regions after one or both of: a threshold number of input images, or set amount of time.

8. The method of claim 1, wherein a threshold number of descriptors to extract is determined according to one or both of: a per input image descriptor threshold, or per region descriptor threshold.

9. The method of claim 1, wherein a size of each of the plurality of regions is determined according to one of: equal area split, superpixel segmentation, or a depth map.

10. The method of claim 1, further comprising:
increasing the probability of selection for one or more adjacent regions to a respective region in response to having confidence for the respective region.

11. A machine readable non-transitory storage medium having stored therein program instructions that are executable by a processor to:
receive an input image frame;
create a plurality of distinct regions within the input image frame, wherein the plurality of distinct regions has a first probability distribution comprising of a particular probability of being selected for each respective region in the plurality of distinct regions;
select, according to the first probability distribution, a first region from the plurality of distinct regions;
extract, from the first region, a first one or more descriptors from a first one or more feature points detected within the first region;
analyze one or more properties of the first region to update a particular probability of the first region being selected;
create a second probability distribution for the plurality of distinct regions according to the particular probability of the first region being selected;
select, according to the second probability distribution, a second region from the plurality of distinct regions;
extract, from the second region, a second one or more descriptors from a second one or more feature points detected within the second region; and
reference at least the first one or more descriptors and the second one or more descriptors for detecting a target object.

12. The medium of claim 11, further comprising instructions to:
continue, according to updated probability distributions for the plurality of regions, the selecting of regions, extracting of descriptors, and analyzing of one or more properties until detecting one or both of:
a threshold number of descriptors are extracted,
a threshold confidence is met for confirmation of detecting the target object, or
a threshold confidence is met for determining the target object is not present.

13. The medium of claim 11, wherein the instructions to analyze the one or more properties comprises instructions to:
calculate, for one or more feature points in a respective region, a direction vector representing a scale and a direction to a center of the target object determined from a reference database; and
increase probability of selection for the respective region when two or more direction vectors within the respective region intersect.

14. The medium of claim 11, wherein the instructions to analyze the one or more properties comprises instructions to:
calculate, for one or more feature points in a respective region, a direction vector representing a scale and a direction to a center of the target object; and
increase probability of selection for the respective region when the direction vector intersects the respective region.

15. The medium of claim 11, wherein the instructions to analyze the one or more properties comprises instructions to:
match the extracted one or more descriptors to a predetermined reference descriptor associated with the target object; and
increase probability of selection for the respective region in response to the matching.

16. The medium of claim 11, wherein, in response to meeting a threshold confidence for detecting the target object:
determining the target object pose; and
ignoring an area comprising the detected target object when performing additional target object detection in a next input image.

17. The medium of claim 11, wherein, in response to meeting a threshold confidence for determining the target object is not present:
apply a latest probability distribution associated with the plurality of regions to a next input image; and
reset a probability distribution associated with the plurality of regions after one or both of: a threshold number of input images, or set amount of time.

18. The medium of claim 11, wherein a threshold number of descriptors to extract is determined according to one or both of: a per input image descriptor threshold, or per region descriptor threshold.

19. The medium of claim 11, wherein a size of each of the plurality of regions is determined according to one of: equal area split, superpixel segmentation, or a depth map.

20. The medium of claim 11, further comprising instructions to:
increase the probability of selection for one or more adjacent regions to a respective region in response to having confidence for the respective region.

21. A server to provide target object detection, the server comprising:
memory; and
a processor coupled to the memory and configured to:
receive an input image frame;
create a plurality of distinct regions within the input image frame, wherein the plurality of distinct regions has a first probability distribution comprising of a particular probability of being selected for each respective region in the plurality of distinct regions;

select, according to the first probability distribution, a first region from the plurality of distinct regions;

extract, from the first region, a first one or more descriptors from a first one or more feature points detected within the first region;

analyze one or more properties of the first region to update a particular probability of the first region being selected;

create a second probability distribution for the plurality of distinct regions according to the particular probability of the first region being selected;

select, according to the second probability distribution, a second region from the plurality of distinct regions;

extract, from the second region, a second one or more descriptors from a second one or more feature points detected within the second region; and reference at least the first one or more descriptors and the second one or more descriptors for detecting the target object.

22. The server of claim 21, further comprising instructions to:

continue, according to updated probability distributions for the plurality of regions, the selecting of regions, extracting of descriptors, and analyzing of one or more properties until detecting one or both of:

a threshold number of descriptors are extracted, a threshold confidence is met for confirmation of detecting the target object, or a threshold confidence is met for determining the target object is not present.

23. The server of claim 21, wherein the instructions to analyze the one or more properties comprises instructions to:

calculate, for one or more feature points in a respective region, a direction vector representing a scale and a direction to a center of the target object determined from a reference database; and increase probability of selection for the respective region when two or more direction vectors within the respective region intersect.

24. The server of claim 21, wherein the instructions to analyze the one or more properties comprises instructions to:

calculate, for one or more feature points in a respective region, a direction vector representing a scale and a direction to a center of the target object; and increase probability of selection for the respective region when the direction vector intersects the respective region.

25. The server of claim 21, wherein the instructions to analyze the one or more properties comprises instructions to:

match the extracted one or more descriptors to a predetermined reference descriptor associated with the target object; and increase probability of selection for the respective region in response to the matching.

26. The server of claim 21, wherein, in response to meeting a threshold confidence for detecting the target object:

determining the target object pose; and ignoring an area comprising the detected target object when performing additional target object detection in a next input image.

27. The server of claim 21, wherein, in response to meeting a threshold confidence for determining the target object is not present:

apply a latest probability distribution associated with the plurality of regions to a next input image; and reset a probability distribution associated with the plurality of regions after one or both of: a threshold number of input images, or set amount of time.

28. An apparatus for target object detection, the apparatus comprising:

means for receiving an input image frame;

means for creating a plurality of distinct regions within the input image frame, wherein the plurality of distinct regions has a first probability distribution comprising of a particular probability of being selected for each respective region in the plurality of distinct regions;

means for selecting, according to the first probability distribution, a first region from the plurality of distinct regions;

means for extracting, from the first region, a first one or more descriptors from a first one or more feature points detected within the first region;

means for analyzing one or more properties of the first region to update a particular probability of the first region being selected;

means for creating a second probability distribution for the plurality of distinct regions according to the particular probability of the first region being selected;

means for selecting, according to the second probability distribution, a second region from the plurality of distinct regions;

means for extracting, from the second region, a second one or more descriptors from a second one or more feature points detected within the second region; and means for referencing at least the first one or more descriptors and the second one or more descriptors for detecting the target object.

29. The apparatus of claim 28, further comprising:

means for continuing, according to updated probability distributions for the plurality of regions, the selecting of regions, extracting of descriptors, and analyzing of one or more properties until detecting one or both of:

a threshold number of descriptors are extracted, a threshold confidence is met for confirmation of detecting the target object, or a threshold confidence is met for determining the target object is not present.

30. The apparatus of claim 28, wherein the analyzing the one or more properties comprises:

means for calculating, for one or more feature points in a respective region, a direction vector representing a scale and a direction to a center of the target object determined from a reference database; and means for increasing probability of selection for the respective region when two or more direction vectors within the respective region intersect.

* * * * *